United States Patent [19]

André

[11] Patent Number: 5,138,819
[45] Date of Patent: Aug. 18, 1992

[54] SUGAR CANE BASE CUTTER POSITION CONTROL DEVICE

[75] Inventor: Robert T. André, New Iberia, La.

[73] Assignee: Cameco Industries, Inc., Thibodaux, La.

[21] Appl. No.: 637,123

[22] Filed: Jan. 3, 1991

[51] Int. Cl.⁵ .................... A01D 45/10; A01D 75/28
[52] U.S. Cl. ........................ 56/10.2; 56/63; 56/208; 56/DIG. 10
[58] Field of Search ........ 56/17.1, 53, 51, 63, 56/208, 121.41, 121, 43, 121.46, DIG. 10, DIG. 11, DIG. 15, 10.2, 500, 503; 172/3, 5, 233, 234

[56] References Cited

U.S. PATENT DOCUMENTS

| | | | |
|---|---|---|---|
| 2,953,886 | 9/1960 | Douglas et al. | 56/17 |
| 3,307,338 | 3/1967 | Mizzi | 56/16 |
| 3,456,429 | 7/1969 | Sexton, Jr. | 56/16 |
| 3,848,399 | 11/1974 | Makeham | 56/13.9 |
| 4,019,308 | 4/1977 | Quick | 56/13.9 |
| 4,035,996 | 7/1977 | Fernandez et al. | 56/13.9 |
| 4,070,809 | 1/1978 | Soulat | 56/13.9 |
| 4,170,098 | 10/1979 | Moreno et al. | 56/13.9 |
| 4,380,281 | 4/1983 | Duncan | 198/304 |
| 4,512,142 | 4/1985 | Landry et al. | 56/13.9 |
| 4,541,229 | 9/1985 | Elijah | 56/208 X |
| 4,809,487 | 3/1989 | Junge et al. | 56/10.2 |

FOREIGN PATENT DOCUMENTS

| | | | |
|---|---|---|---|
| 1955243 | 5/1970 | Fed. Rep. of Germany | 56/208 |
| 2654141 | 6/1978 | Fed. Rep. of Germany | 56/DIG. 15 |
| 2701117 | 7/1978 | Fed. Rep. of Germany | 56/10.2 |
| 540597 | 1/1977 | U.S.S.R. | 56/208 |

*Primary Examiner*—David J. Bagnell
*Attorney, Agent, or Firm*—Pravel, Gambrell, Hewitt, Kimball & Krieger

[57] ABSTRACT

A sugar cane harvester has a base cutter elevation control system that compensates for changes in terrain such as ruts, small hills, etc. by raising or lowering the base cutter. A forwardly positioned slipper assembly gives feedback as to upcoming changes in terrain. A sensor also monitors tire position as when the harvester sinks into soft spots, muddy spots and the like wherein base cutter position is adjusted to compensate for sinkage of the tires.

21 Claims, 6 Drawing Sheets

SUGAR CANE BASE CUTTER POSITION CONTROL DEVICE

BACKGROUND OF THE INVENTION

1. Field Of The Invention:

The present invention relates to sugar cane harvesters and more particularly relates to an improved wholestalk sugar cane harvesters of the type wherein a base cutter severs the cane at or near ground level and a topper severs the upper portion of the cane to remove leafy material with the cane wholestalks being conveyed through the harvester and discharged to the rear or to left or right sides of the machine for subsequent loading into cane carts. More particularly, the present invention relates to an improved two row wholestalk type sugar cane harvester wherein two rows of cane are harvested simultaneously and wherein an improved base cutter position control device automatically raises or lowers the base cutter to compensate for changes in the elevation of the underlying terrain so that the cane is always cut very close to ground level eliminating the substantial waste of the base cutter cutting the cane too high above ground level.

Even more particularly, the present invention relates to an improved sugar cane harvester having a base cutter position control device that selectively adjusts the position of the base cutter depending upon changes in ground level elevation and changes in wheel positions, as when one or more of the harvester wheels sinks into the mud.

2. General Background:

In the harvesting of sugar cane, there is typically employed a harvester which can be a "billet" type harvester (also known as a chopper harvester) or a wholestalk harvester. A billet type or chopper harvester chops the cane off at its base, near ground level and then chops that stalk into small sections of for example six inches to twelve inches (6"-12") in length. A wholestalk harvester leaves the cane in substantially a single wholestalk form because the cane is only cut in two positions, namely at the top and at the bottom. With a wholestalk harvester, a base cutter chops the cane at or near ground level while a topper cuts the upper most portion of the cane to eliminate the leafy material that is predominantly found on the top end portion of the stalk. Wholestalk harvesters then convey the cut cane through the machine and pile the cane behind the machine or to the sides of the machine in parallel fashion. An example of a two row wholestalk harvester can be seen in the Richard Duncan U.S. Pat. No. 4,380,281, which is incorporated herein by reference. Several Massey Ferguson owned patents have been issued which relate to billet or chopper harvesters. An example is U.S. Pat. No. 3,848,399 issued to Sam R. Makeham and assigned to Massey Ferguson, Ltd.

During use, a wholestalk harvester can encounter changes in the elevation of the underlying terrain, undulating terrain, and soft or low spots in the terrain such as ruts, potholes, soft spots, uneven cultivation etc. These changes in terrain cause the harvester to tip from one side to the other, or in a fore/aft direction or to sink with respect to a pure horizontal plane so that the base cutter moves upwardly and downwardly constantly changing the position of the cut with respect to the ground surface.

If the wheels of the harvester sink into the mud, the harvester can actually cut the stalk too low, and even below the ground surface. If the wheels of the harvester engage a high spot, the base cutter rises a few inches above its normal operating position, cutting high on the cane stalk and wasting that portion of the cane stalk between the ground surface and the position of the cut (which can be a substantial waste of several inches of cane stalk. This waste factor can be extensive, considering an entire crop of thousands of acres of cane for example.

Therefore, there is a need for a wholestalk sugar cane harvester having an improved base cutter arrangement that automatically controls the position of the base cutter with respect to the cane being cut, notwithstanding changes in position of the harvester wheels and notwithstanding the change in elevation of the terrain which the harvester can encounter on a continual basis. It is thus necessary to constantly monitor and adjust the base cutter position. Several devices have been patented that relate to sugar cane harvesters and to sugar harvesters systems, some of which relate to base cutters and some of which relate to mechanisms for raising and lowering base cutters.

In the Douglas U.S. Pat. No. 2,953,886 entitled "Sugar Cane Harvester With Cutting Apparatus" there is shown an early version of a sugar cane harvester having a tractor with a side mounted harvester portion that includes a pair of base cutter blades.

In the Mizzi U.S. Pat. No. 3,307,338, a sugar cane harvester is of a side mounted variety that is equipped with a base cutter. The harvester cuts cane stalks into pieces which are thrown rearwardly by a rotary chopping cutter.

In the Sexton U.S. Pat. 3,456,429 there is provided a sugar cane harvesting apparatus having a forward portion that carries a base cutter. The forwardly extending portion is supported upon wheels that are much smaller than the wheels which support the majority of the harvester.

In the above mentioned Makeham U.S. Pat. No. 3,848,399 entitled "Sugar Cane Harvesters" there is provided a harvester having twin contra-rotating base cutters feeding whole sticks to each cane chopping apparatus which subdivides the sticks. Each base cutter is in the form of a drum, open at one end and arranged with its open end facing downwards. Outwardly projecting blades are mounted at the open end of the drum. The blades are thereby downwardly offset from the closed end of the drum which reduces power consumption and causes less soil and stones to be fed into the harvester with cane sticks.

Base cutters are shown in the Quick U.S. Pat. No. 4,019,308 entitled "Base Cutting Apparatus for Sugar Cane Harvesters". The '308 Quick patent provides a sugar cane harvester having a pair of contra-rotatable base cutters with projecting blades to sever cane sticks from their roots. The base cutters are constructed to minimize the quantity of earth fed into the harvester with the crop. A large free area is provided between the successive blades for earth and rocks to drop out, but each blade has a long exposed cutting edge to prevent cane sticks entering the area without being cut. The blades are mounted on a support member having a flat profile to minimize the paddling action of the base cutters on earth and rocks.

A harvester combine is the subject of the Fernandez U.S. Pat. No. 4,035,996 in which a frame is pivotally mounted on a chassis of a self-propelled vehicle so as to be at least partially suspended beyond the front of the chassis. A plurality of cutter mechanisms, one of which is movable with respect to the ground, are provided for cutting the crop to be harvested. A conveyor transports the cut, harvested crop and extraneous material rearwardly to a cleaning chamber in which the cut harvested crop is separated from the extraneous material and is separately recovered.

A machine for harvesting sugar cane is the subject of U.S. Pat. No. 4,070,809 entitled "Automatic Sugar Cane Harvesting Machine". The harvester runs on a pair of driving wheels and a pair of guide wheels. At the front of the machine there is arranged a pair of arms, the ends of which rest on the ground and on which are mounted a pair of rotating conical members which lift the sugar cane which is to be cut near its base by a pair of rotating cutters, the height of which is controlled by the pair of arms. The cut stems are then sliced into pieces by blades mounted on a rotating drum which blades cooperate with bars mounted on a second rotating drum. The cut pieces of cane, together with the waste lighter elements are then projected towards an elevator through an airflow from a nozzle which carries away the waste and allows the cane to reach the elevator.

In the Moreno et al. U.S. Pat. No. 4,170,098, an apparatus for harvesting sugar cane employs a self-propelled chassis for the harvesting of sugar cane employing copying wheels for following the microrelief of the ground responsive to movement in a harvesting section of the apparatus. A cross-cutting assembly employing two differently dimensioned drums with offset blades is used to cut the cane, and an associated pneumatically operated cleaning chamber employs dispersing drums, veins and shutters in conjunction with specifically placed blowers, which act upon foreign matter during the harvesting operation and eject the same to the outside chamber where it is deflected to a desired location.

The Landry U.S. Pat. No. 4,512,142 entitled "Scroll Type Gatherer and Top Shredder With Longitudinal Blades for Sugar Cane Harvesters" shows an attachment for a sugar cane harvester for gathering, severing or chopping or shredding the nonmillable immature top portions of a sugar cane stalk so that the remaining millable portion of the sugar cane stalk can be harvested by the sugar cane harvester in a conventional manner.

SUMMARY OF THE PRESENT INVENTION:

The present invention provides an improved sugar cane harvester having a harvester frame and a plurality of wheels supporting the frame including at least two larger front wheels and a least one small rear wheel. A base cutter is provided for severing cane stalks to be harvested, at a position adjacent the underlying ground surface.

A cane topper is provided for cutting the uppermost end of the cane stalks to be harvested so that the cane to be harvested is in a wholestalk form after exiting the base cutter and the topper. A cane feed intake is provided for conveying two rows of cane wholestalks at a time into the harvester and along a pair of adjacent feed paths that extend from the base cutter rearwardly to points of discharge that include cane discharges on both the left and right sides of the harvester.

A forwardly positioned ground level sensor is carried by the frame and in front of the larger wheels for sensing undulations in the ground surface. A hydraulic power source is provided for raising and lowering the base cutter in response to the sensing of changing ground elevations at the sensor so that the base cutter automatically adjusts to a cutting position that severs the cane stalks very close to the ground level. The apparatus has two ways to maintain the base cutter position in relation to the sugar cane stalk growing area. Firstly, the ground level sensor uses a forwardly positioned slipper mounted on the front end of one of the gathering arms and adjacent the stalk growing area at the ground line. A mechanical compensator activates a hydraulic control valve or servo-valve that supplies hydraulic power to a hydraulic cylinder controlling base cutter elevational position in relation to the sensor slipper. Secondly, a ground penetration compensator controlled by the gathering arm position in relation to the harvesting machine main chassis activates the same hydraulic control valve discussed above, to adjust the base cutter position in relation to the amount of soil penetration by the harvester wheels. This adjustment is made by the same above discussed hydraulic cylinder.

A manual adjustment by a manually controlled hydraulic valve in the operator cab can be used to bias the compensators in relation to the ground level sensor slipper and the ground penetration sensor. The above discussed controls allow the harvester operator to spend more time controlling machine direction, topping height and avoiding usual field hazards.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
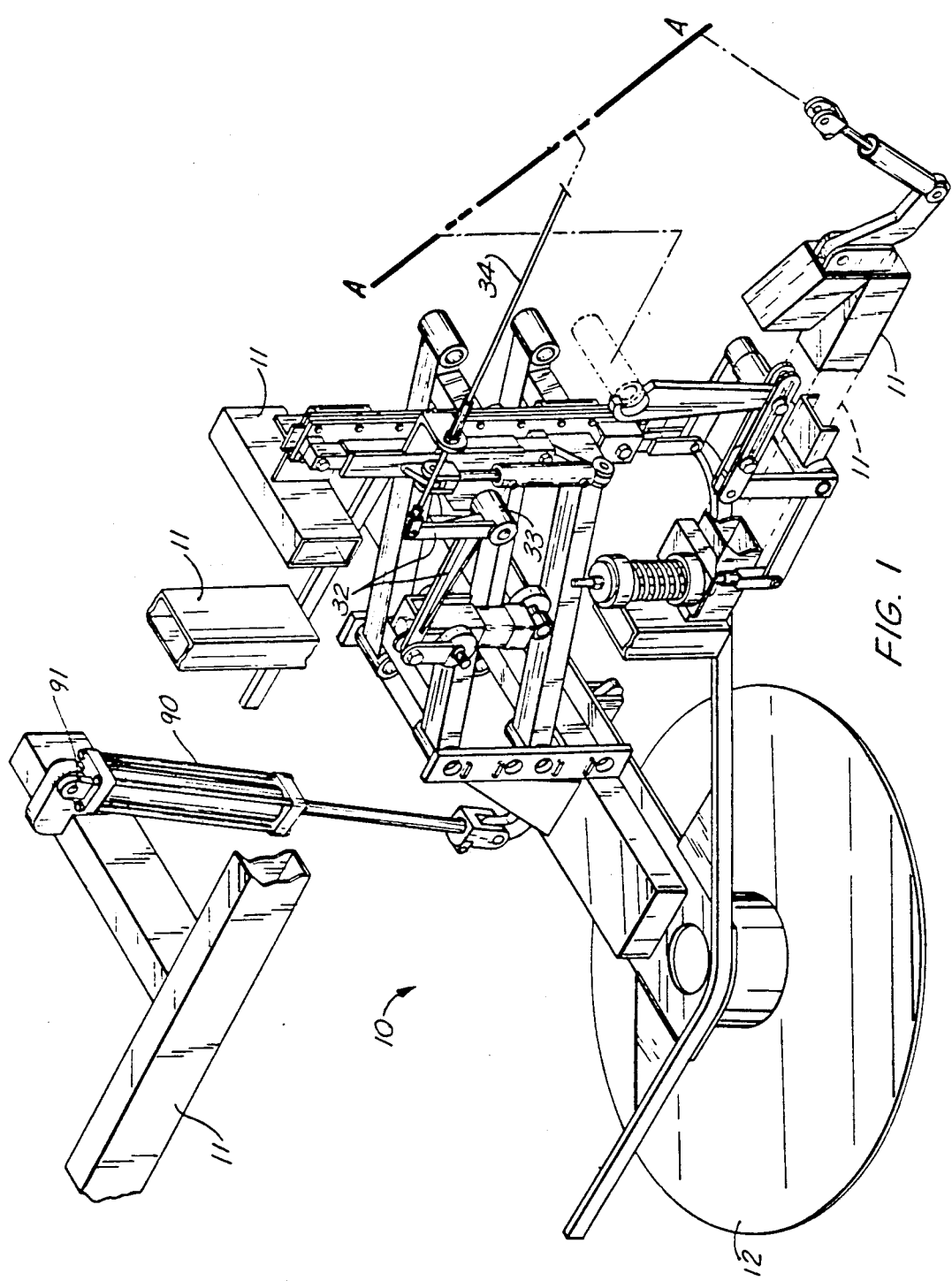
FIG. 1 is a perspective view of the preferred embodiment of the apparatus of the present invention.
Figure 2:
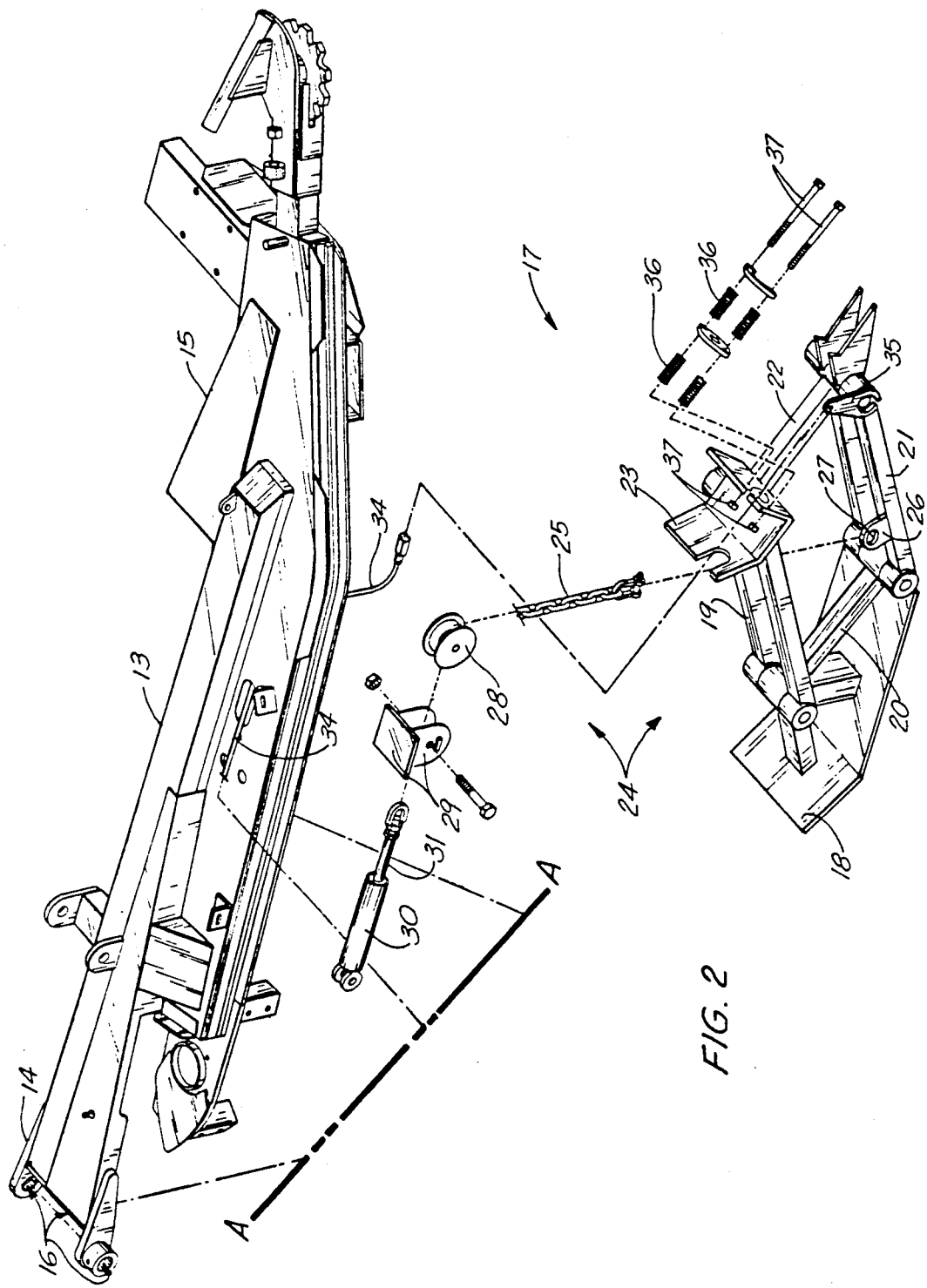
FIG. 2 is an exploded fragmentary view of the preferred embodiment of the apparatus of the present invention.
Figure 3:
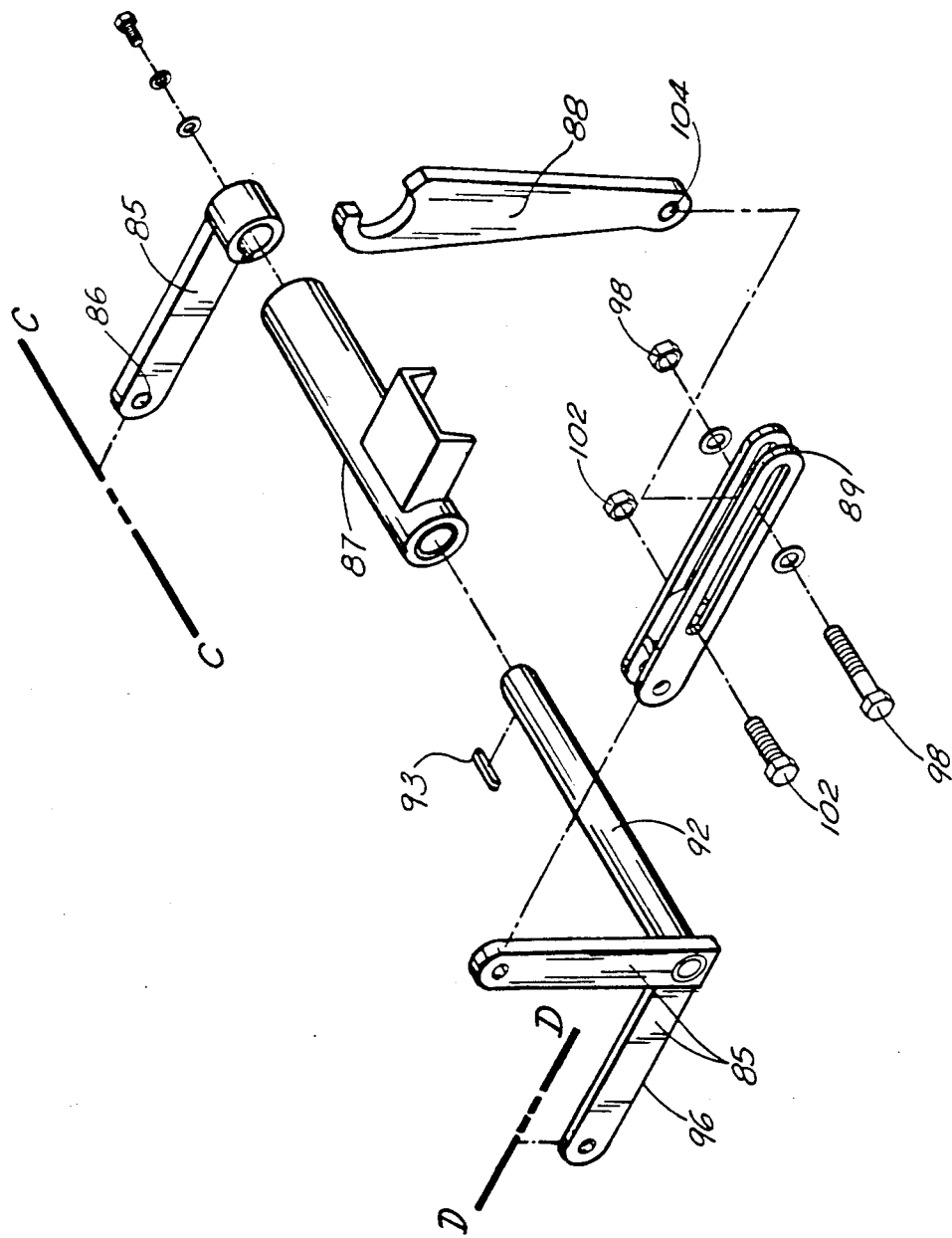
FIG. 3 is another exploded fragmentary view of the preferred embodiment of the apparatus of the present invention.
Figure 4:
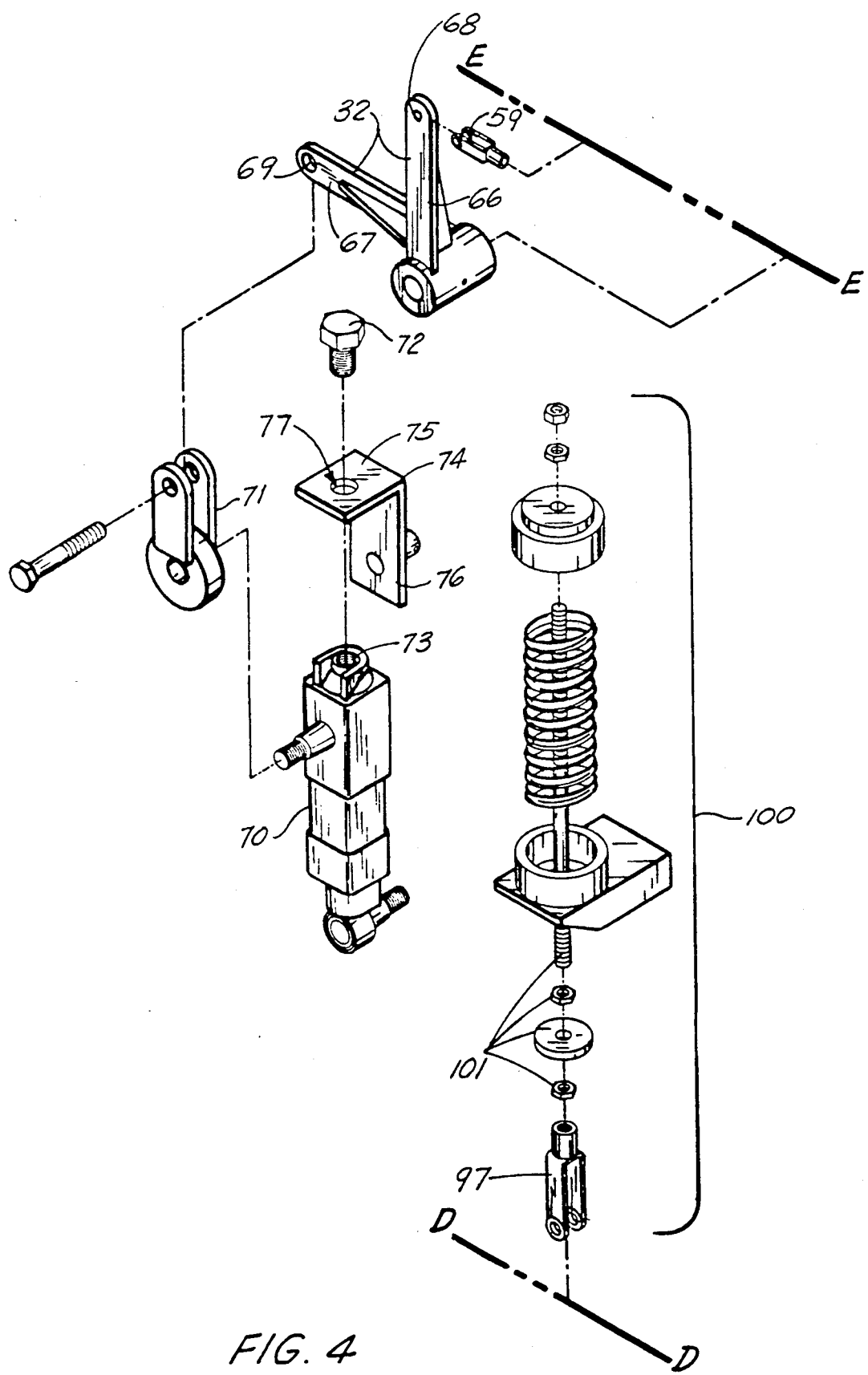
FIG. 4 is an exploded perspective fragmentary view of the preferred embodiment of the apparatus of the present invention illustrating the control valve, bell crank and follower spring.
Figure 5:
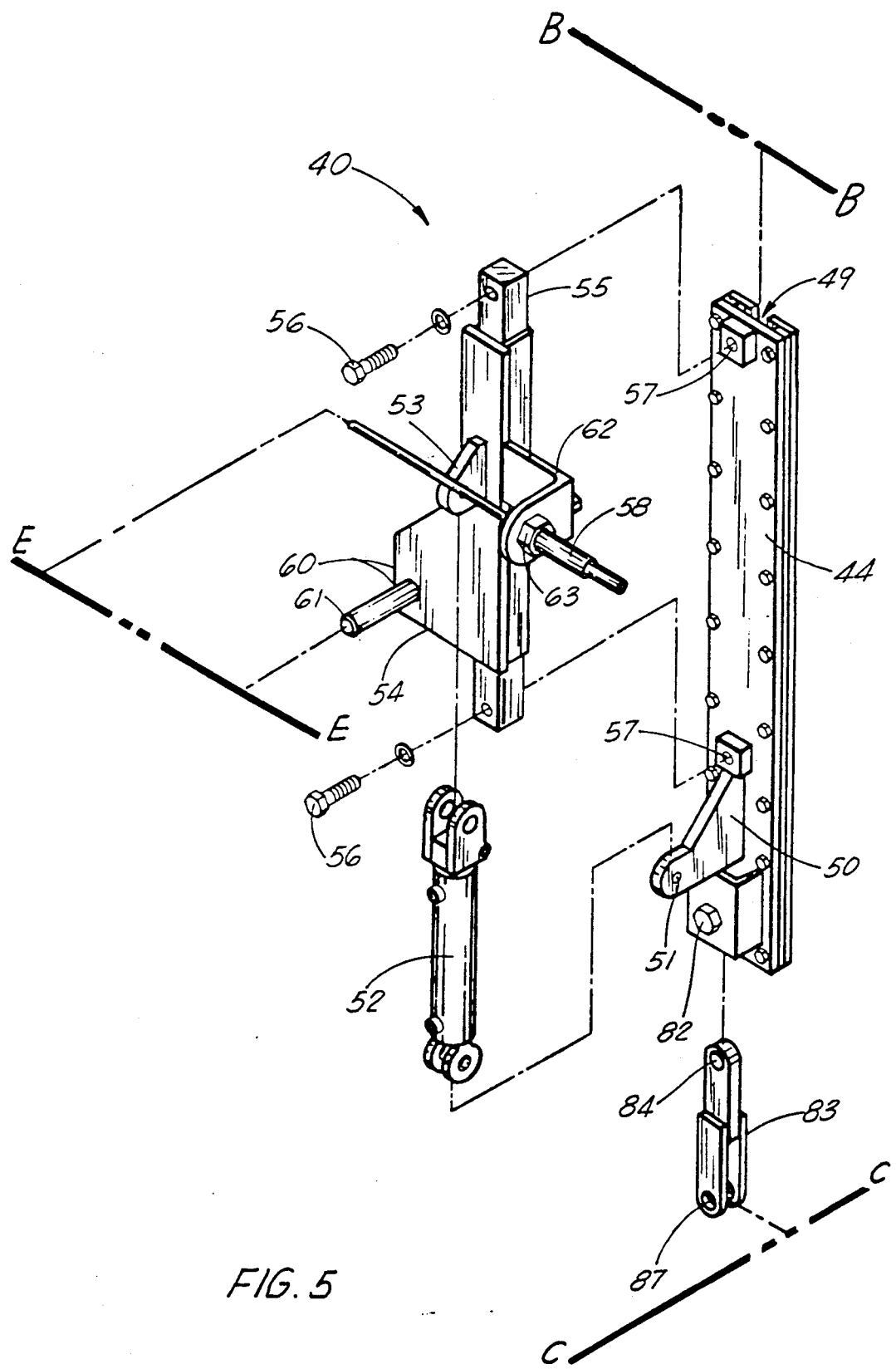
FIG. 5 is an exploded perspective fragmentary view of the preferred embodiment of the apparatus of the present invention illustrating the bias slider assembly and compensator slider assembly.
Figure 6:
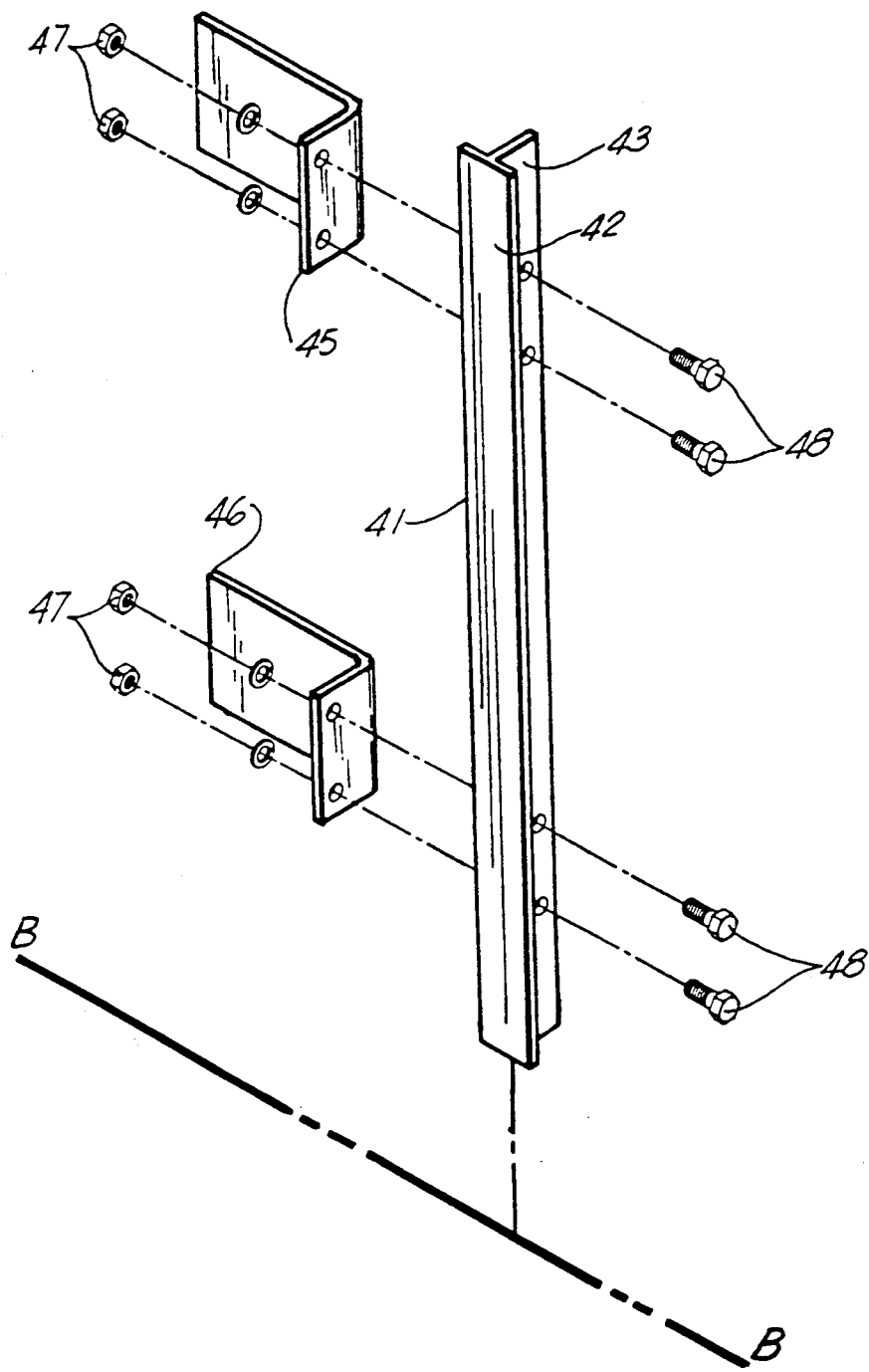
FIG. 6 is a fragmentary perspective view of the preferred embodiment of the apparatus of the present invention illustrating the sliderail and its mounting clips.

FIGS. 1 and 2–6 illustrate generally the preferred embodiment of the sugar cane harvester apparatus of the present invention, designated generally by the numeral 10 in FIG. 1. Harvester 10 has a structural machine chassis or frame 11 as seen for example in U.S. Pat. No. 4,380,281 which is incorporated herein by reference. A pair of base cutters 12 are mounted to frame 11 and typically are rotary cutters in the form of disks with cutter blades mounted on the periphery of the disks. Gathering arms 13 lift and intake growing cane stalks that may be vertically standing, or may be recumbent.

Base cutters 12 are supported at the lower end of the harvester frame 11, suspended a few inches above ground surface so that the base cutter hopefully severs each cane stalk at or a few inches above ground surface. However, changes in the terrain caused by potholes, muddy or soft spots, hills and the like can lift or lower the harvester frame, changing the position of the cut so that the base cutter hits low into the soil or high on the stalk creating waste. This waste can be significant when multiplied over thousands of acres of sugar cane cut by the harvester in a season of several months.

Gathering arms 13 have rear end 14 that pivotally attaches to frame 11 at pivot 16, and a front or leading end 15. Ground level sensor assembly 17 is mounted on gathering arm 13 at the front end 15. Sensor assembly 17 includes a slipper 18 adapted to slide upon the ground surface, tracking the changes in terrain such as holes, small hills and the like.

A plurality of sensor link arms 19-22 support slipper in movable fashion so that it can move with the terrain independently of the harvester frame 11. Sensor mounting bracket 23 affixes the slipper 18 to gathering arm 13 by welding for example. A lifting mechanism 24 can be used to selectively raise the slipper 18. Chain 25 attaches to slipper assembly 18 at gusset 26 having an opening 27 therein. Sheave 28 is affixed to gathering arm 13 with sheave housing 29 being welded for example to the underside of gathering arm 13. Hydraulic cylinder 30 has a push rod 31 which is connected at one end portion to chain 25. Extension and retraction of the push rod 31 operates to raise and lower slipper 18.

Bell crank 32 operates servo-valve 70 automatically when slipper 18 engages a small hill or a small depression in the underlying terrain to automatically raise and lower the bottom blade cutter 12 of the harvester. Bell crank 32 has a pivot 33 thereon. Opening 68 of bell crank 32 attaches to one end portion of push/pull cable 34. The opposite end portion of cable 34 attaches to the slipper 18 at yoke 35. Cable protectors 36 can be positioned on opposite sides of push/pull cable 34. Bolted connection 37 secures cable 34 to slipper 18 at yoke 35. The push/pull cable 34 activates control valve 70 to supply hydraulic fluid to cylinder 90 which controls base cutter 12's elevational position.

A ground penetration compensator slider assembly 40 includes a vertical fixed rail 41 which is preferably T-shaped in horizontal section including flange 42 and flange 43. Compensator slider 44 slidably attaches to and moves upon fixed vertical rail 41. A pair of spaced apart clips 45, 46 are attached to fixed rail 41 and the rail 41 is bolted or welded to the harvester frame 11 using the clips 45, 46. Bolted connections 47, 48 attach vertical rail 41 to clips 45, 46. The compensator slider assembly 44 thus includes a longitudinal, vertical slot 49 that is sized to receive fixed vertical rail 41 therein.

Compensator slider 44 carries a gusset 50 having an opening 51 therein so that hydraulic cylinder 52 can attach to the opening 51 and thus the gusset 50. Hydraulic cylinder 52 can be used by the operator to bias the base cutter 12 to a particular elevation. Mounting bracket 54 attaches by bolting for example to compensator slider 44. Bias rail 55 is in the form of a generally rectangular elongated rod. Bolted connection 56 passes through openings at the upper and lower ends of bias rail 55 for forming bolted connections 56 of bias rail 55 to compensator slider 44 at threaded openings 57. The lower end of cylinder 52 attaches to gusset plate member 64. In this manner, bias rail 55 and compensator slider 44 can be moved to a desired bias position (or preliminary elevational position) by the harvester operator with cylinder 52 extending or retracting as selected. After such a bias position is selected, further basecutter level compensation is achieved using slipper 18 to monitor changes in ground elevation and by the ground penetration compensator system to correct for the amount of soil penetration by the harvester wheels.

The rear end 58 of push pull cable 34 attaches to mounting bracket 54. The opposite or front end 59 of push pull cable 34 attaches to yoke 35 a aforementioned. Mounting bracket 54 also includes bias slider assembly 60 that includes bell crank shaft 61 and cable support 62. Bolted connection 63 affixes the end 58 of push/pull cable 34 to mounting bracket 54. Bell crank assembly 32 pivotally attaches to mounting bracket 54 at bell crank opening 65 and upon shaft 61. The bell crank assembly 32 includes a pair of crank arms 66, 67 with respective openings 68, 69 being provided at the outer end of each crank arm 66, 67. The opening 68 of arm 66 forms an attachment to the yoke 59 of push/pull cable 34. The crank arm 67 attaches at its opening 69 to servo-valve 70 at toggle 71. In this manner, linear movement of the push/pull cable 34 is translated into rotational movement of the bell crank 65 and of the crank arms 66, 67 about shaft 61.

When the push/pull cable 34 rotates the bell crank 32, the crank arm 68 moves the servo-valve 70 so that the servo-valve 70 selectively controls hydraulic fluid flow to cylinder 90 and causes the hydraulic cylinder 90 to selectively raise or lower the base cutter 12. Servo-valve 70 is a commercially available valve such as is manufactured by Vickers Company, having model number SV20. Valve bracket 74 can be bolted or welded to frame 11 and servo-valve 70 attaches to valve bracket 74 using bolted connection 72, 73. Valve bracket 74 includes a first flange 75 that attaches to servo-valve 70 at opening 77 and a second flange 76 that attaches to harvester frame 11.

Base cutter 12 is movably supported to move up and down upon a plurality of support arms 78-81. Base cutter 12 is lifted and lowered upon changes in the position of bell crank 32 as the bell crank defines the flow of fluid through control valve 70 which commands operation of hydraulic cylinder 90. Hydraulic cylinder 90 attaches to frame 11 at 91 with a pivotal connection and bell crank 32 attaches to the push rod end of push/pull cable 34. Extension and retraction of cylinder 90 changes elevation of base cutter 12

A second adjustment of the bottom blade is provided based upon sinkage of either of the harvester wheels into the underlying earth such as in ruts, muddy holes, and the like. As the wheel profile penetrates the ground, the gathering arm 13 attitude changes as slipper 18 remains at the same elevation relative to ground surface. Gathering arm link 105 is fixed to gathering arm 13 and so rotates about a common axis namely the pivot 16 center. This motion causes, slider 44 to be raised and lowered via slotted link 89, pivot arm assembly 85, and toggle 83.

Compensator slider assembly 40 is moved upwardly and downwardly by toggle 83 which attaches thereto with bolted connection 82 and through opening 84. Toggle 83 attaches to pivot arm assembly 85 at opening 86, 87.

The pivot arm assembly 85 includes shaft 92 and key way 93 affixing arm 96 and shaft 92 together for rotation on pivot boss 87 which is welded to frame 11. The pivot arm assembly 85 attaches using bolted connection 101 to follower spring assembly 100 at yoke 97.

The pivot arm assembly 85 also attaches to slotted link 89 which is attached at its end portion to gathering arm link 88. The gathering arm link 88 attaches to gathering arm pivotal end connection 16 for rotation about the pivot 16 with gathering arm 13. Bolted connection 102 affixes slotted link 89 to pivot arm assembly 85 at an opening. Bolted connection 98 connects slotted link 89 to gathering arm link 88 at opening 104.

Gathering arm 13 position in relation to the harvester main frame 11 changes the rotational position of pivot 16 and the attached gathering arm link 88. Link 88 moves slotted link 89 either rearwardly or forwardly. The movement of link 89 is depending upon whether the harvester wheels sink or elevate. Fore/aft movement of slotted link 89 translates into rotational movement of pivot arm assembly 85 which in turn translates into upward or downward movement of slider assembly 44 which lifts bell crank 32 causing its arms 66, 67 to rotate, thus operating control valve 70 to control hydraulic fluid flow to hydraulic cylinder 90, lifting or lowering base cutter 12.

The table 1 below lists the parts by number and description as used herein and on the drawings.

TABLE 1

PARTS LIST

| PART NUMBER | DESCRIPTION |
| --- | --- |
| 10 | sugar cane harvester |
| 11 | frame |
| 12 | basecutter |
| 13 | gathering arm |
| 14 | rear end gathering arm |
| 15 | front end gathering arm |
| 16 | pivot |
| 17 | ground level sensor assembly |
| 18 | slipper |
| 19 | sensor link arm |
| 20 | sensor link arm |
| 21 | sensor link arm |
| 22 | sensor link arm |
| 23 | sensor mounting bracket |
| 24 | sensor lifting mechanism |
| 25 | chain |
| 26 | gusset |
| 27 | opening |
| 28 | sheave |
| 29 | sheave housing |
| 30 | hydraulic cylinder |
| 31 | pushrod |
| 32 | bell crank |
| 33 | openings |
| 34 | push/pull cable |
| 35 | yoke |
| 36 | cable protector |
| 37 | bolted connection |
| 40 | compensator slider assembly |
| 41 | fixed vertical rail |
| 42 | flange |
| 43 | flange |
| 44 | compensator slider |
| 45 | clip |
| 46 | clip |
| 47 | bolted connection |
| 48 | bolted connection |
| 49 | slot |
| 50 | gusset |
| 51 | opening |
| 52 | hydraulic cylinder |
| 53 | mounting bracket |
| 54 | mounting bracket |
| 55 | bias rail |
| 56 | bolt |
| 57 | threaded openings |
| 58 | rear end cable |
| 59 | front end cable |

TABLE 1-continued

PARTS LIST

| PART NUMBER | DESCRIPTION |
| --- | --- |
| 60 | bias slider assembly |
| 61 | bell crank shaft |
| 62 | cable support |
| 63 | bolted connection |
| 64 | gusset plate member |
| 65 | bell crank opening |
| 66 | crank arm |
| 67 | crank arm |
| 68 | opening |
| 69 | opening |
| 70 | control valve |
| 71 | toggle |
| 72 | bolt |
| 73 | bolt |
| 74 | valve bracket |
| 75 | flange |
| 76 | flange |
| 77 | opening |
| 78 | base cutter support arm |
| 79 | base cutter support arm |
| 80 | base cutter support arm |
| 81 | base cutter support arm |
| 82 | bolted connection |
| 83 | toggle |
| 84 | opening |
| 85 | pivot arm assembly |
| 86 | opening |
| 87 | opening |
| 88 | gathering arm link |
| 89 | slotted link |
| 90 | hydraulic cylinder |
| 91 | pivotal connection |
| 92 | shaft |
| 93 | keyway |
| 96 | arm |
| 97 | yoke |
| 98 | bolted connection |
| 99 | pivot boss |
| 100 | follower spring assembly |
| 101 | bolted connection |
| 102 | bolted connection |
| 104 | opening |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A sugar cane harvester, comprising:

a) a harvester frame;

b) a plurality of wheels supporting the frame and including at least two larger wheels and at least one smaller wheel;

c) base cutting means for severing cane stalks to be harvested at a position adjacent the underlying ground surface;

d) cane topping means for cutting the uppermost end of the cane stalks to be harvested so that the cane to be harvested is in a wholestalk form after exiting the topping means and base cutting means;

e) cane feed means for conveying the cut cane wholestalks along a feed path that extends from the cutting means to a point of discharge that includes cane discharge on both the left and right sides of the harvester frame;

f) the cane feed means including gathering arm means extending in front of the base cutting means for uplifting and gathering cane stalks to be cut, the gathering arms means having a front end portion that approaches the ground surface during use; and g) power means for raising and lowering the base comprising in part a sensor means positioned adjacent the front end portion of the gathering arm means, cutting means in response to changing ground elevations forward of the wheels and adjacent the feed means so that the base cutting means automatically adjusts to a cutting position that severs the cane stalks close to ground level.

2. The apparatus of claim 1 wherein the gathering arm means is pivotally mounted to the frame for uplifting and gathering cane stalks to be cut.

3. The apparatus of claim 2 wherein the sensing means comprises at least one sensor mounted on the gathering arm means.

4. The apparatus of claim 3 further comprising cable means mounted in part on the gathering arm means for interfacing the base cutter and sensing means.

5. The apparatus of claim 1 wherein the larger wheels are a pair of front wheels positioned on opposite sides of the cane stalks to be cut and harvested.

6. The apparatus of claim 1 wherein the power means includes a hydraulic cylinder extending between the frame and the base cutter.

7. The apparatus of claim wherein there is further provided control valve means for controlling the power means to raise and lift the base cutter.

8. The apparatus of claim wherein the power means includes a hydraulic cylinder for raising or lowering the base cutting means and a control valve for controlling the operation of the hydraulic cylinder.

9. The apparatus of claim 1 wherein the sensing means includes a slipper mounted forward of the wheels and cable means for translating contour ground information from the slipper to the base cutter.

10. The apparatus of claim 9 wherein the cable means operates a control valve that controls hydraulic fluid flow to the power means.

11. A two row wholestalk sugar cane harvester, comprising:
a) a harvester frame;
b) a plurality of wheels supporting the frame and including two larger front wheels and a smaller steerable rear wheel;
c) a pair of base cutting means for simultaneously severing cane stalks in adjacent parallel rows to be harvested at a position adjacent the underlying ground surface;
d) cane topping means for cutting the uppermost end of the cane stalks to be harvested so that the cane to be harvested is in a wholestalk form after exiting the topping means and base cutting means;
e) sensing means including at least a forwardly positioned ground level sensor carried by the frame and in front of the larger wheels for sensing changes in ground surface elevation and a second sensor for sensing changes in wheel elevational position;
f) power means for raising and lowering the base cutting means in response to the sensing of either changing wheel elevational position or changing ground elevations at the sensor so that the base cutting means automatically adjusts to a cutting position that severs the cane stalks close to ground level; and
g) linkage means for interfacing the power means and the sensing means.

12. The apparatus of claim 11 further comprising a gathering arm that is pivotally mounted to the frame and extends forwardly of the frame for raising and gathering of cane to be harvested.

13. The apparatus of claim 11 further comprising a pair of gathering arms positioned on the left and right sides of the harvester frame, forwardly of the two larger front wheels, and the forwardly positioned ground level sensor includes left and right sensors carried by the forward end of each gathering arm.

14. The apparatus of claim 11 wherein the sensing means includes a sensor that tracks the tension, a control valve, a bell crank assembly pivotally mounted on the harvester frame, and a cable attached to the bell crank assembly and to the sensor, so that extension and contraction of the cable operates the control valve via the bell crank assembly to raise and lower the base cutter.

15. The apparatus of claim 11 wherein there is further provided slider assembly mounted in a slidable fashion upon the frame for receiving position information from the sensor including both wheel position information and ground surface elevation information gathered by the forwardly positioned ground level sensor.

16. A two row wholestalk sugar cane harvester, comprising:
a) a harvester frame;
b) a plurality of wheels supporting the frame and including two larger front wheels and a smaller steerable rear wheel;
c) gathering arm means for uplifting and gathering cane stalks to be cut;
d) a pair of base cutting means for simultaneously severing cane stalks in adjacent parallel rows to be harvested at a position adjacent the underlying ground surface;
e) cane topping means for cutting the uppermost end of the cane stalks to be harvested so that the cane to be harvested is in a wholestalk form after exiting the topping means and base cutting means in front of the larger front wheels;
f) sensing means including at least a forwardly positioned ground level sensor carried by the frame and in front of the larger wheels and adjacent the gathering means for sensing changes in ground surface elevation;
g) power means for raising and lowering the base cutting means in response to the sensing of changing ground elevations at the sensor and at the front of the gathering means, so that the base cutting means automatically adjusts responsive to ground contour at the front of the gathering means to a cutting position that severs the cane stalks close to ground level; and
h) linkage means for interfacing the power means and the sensing means.

17. The apparatus of claim 16 wherein the gathering arm is pivotally mounted to the frame.

18. The apparatus of claim 16 wherein there are a pair of gathering arms positioned on the left and right sides of the harvester frame, each forwardly of the two larger front wheels, and a sensor carried by the forward end of one of the gathering arms.

19. The apparatus of claim 16 wherein the sensing means includes a sensor that tracks the terrain, a control valve, a bell crank assembly pivotally mounted on the harvester frame, and a cable attached to the bell crank assembly and to the sensor, so that extension and contraction of the cable operates the control valve via the bell crank assembly to raise and lower the base cutter.

20. The apparatus of claim 16 wherein there is further provided a slider assembly mounted in a slidable fashion upon the frame for receiving position information from the sensor including both wheel position information and ground surface elevation information gathered by the forwardly positioned ground level sensor.

21. A sugar cane harvester, comprising:
   a) a harvester frame;
   b) a plurality of wheels supporting the frame and including at least two larger wheels and at least one smaller wheel;
   c) base cutting means for severing cane stalks to be harvested at a position adjacent the underlying ground surface;
   d) cane topping means for cutting the uppermost end of the cane stalks to be harvested so that the cane to be harvested is in a wholestalk form after exiting the topping means and base cutting means;
   e) cane feed means for conveying the cut cane wholestalks along a feed path that extends from the cutting means to a point of discharge that includes cane discharge on both the left and right sides of the harvester frame;
   f) the cane feed means including gathering arm means extending in front of the base cutting means for uplifting and gathering cane stalks to be cut, the gathering arms means having a front end portion that approaches the ground surface during use;
   g) power means for raising and lowering the base comprising in part a sensor means positioned adjacent the front end portion of the gathering arm means, cutting means in response to changing ground elevations forward of the wheels and adjacent the feed means so that the base cutting means automatically adjusts to a cutting position that severs the cane stalks close to ground level;
   h) sensing means that comprises at least one sensor mounted on the gathering arm means; and
   i) a cable means mounted in part on the gathering arm means for interfacing the base cutter and sensing means.

* * * * *